(No Model.)
N. WHITE.
HAND GARDEN WEEDER.
No. 489,058. Patented Jan. 3, 1893.
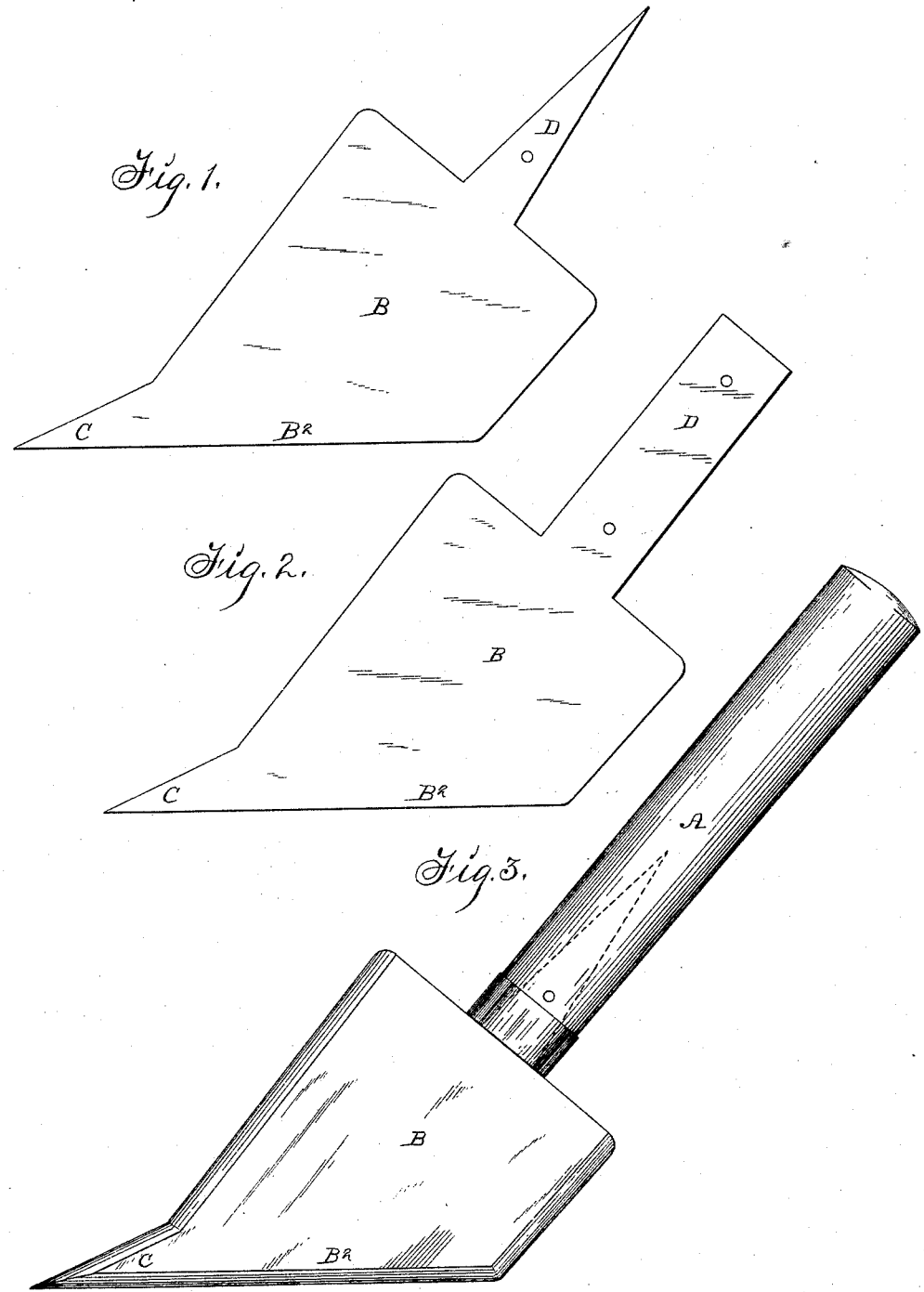

UNITED STATES PATENT OFFICE.

NICHOLAS WHITE, OF CUMMINGS, IOWA.

HAND GARDEN-WEEDER.

SPECIFICATION forming part of Letters Patent No. 489,058, dated January 3, 1893.

Application filed September 23, 1892. Serial No. 446,725. (No model.)

*To all whom it may concern:*

Be it known that I, NICHOLAS WHITE, a citizen of the United States of America, residing at Cummings, in the county of Warren and State of Iowa, have invented an Improved Hand-Weeder, of which the following is a specification.

My object is to provide a cheap, simple and durable knife, of a shape adapted to readily and conveniently be used to remove weeds &c. from plants in close proximity to each other and at the same time be of a shape convenient for a variety of other purposes.

My invention consists in the peculiar shape of the blade whereby it is adapted to perform certain functions hereinafter set forth and pointed out in my claim.

In the accompanying drawings Figure 1 is a plan view of one form of knife blade as it is stamped out of sheet metal. Fig. 2 is a like view of a slightly modified form of the same and Fig. 3 shows the complete knife.

Referring to the accompanying drawings, the reference letter A is used to designate the handle.

B designates the blade which is made flat so that it may be stamped out of a piece of sheet metal complete in one piece. Its lower edge at $B^2$ is disposed at an angle approximating forty-five degrees relative to the handle, so that a straight downward stroke may be made while the arm is in a natural and easy position. The forward and rear edges are also sharpened and are in parallel position with the handle. On the forward and under corner of the blade is formed the sharpened projection C which is tapered to a point and inclined downwardly and forwardly relative to the blade so that the knife may be turned to either side and the said projection be used to remove weeds from the sides of the plants. The projection D is for the purpose of attaching the knife to a handle, with the form shown in Fig. 1 the sharpened projection is driven in the handle and then riveted therein and with the form shown in Fig. 2 it is necessary to first cut the handle and then place the projection therein and rivet it to the handle.

Having thus described the device what I claim as my invention and desire to secure by Letters-Patent is:

An improved knife comprising a suitable handle, a flat blade sharpened on its edges and attached to the said handle and having its lower edge inclined at an angle approximating forty-five degrees relative to the handle and a projection on its forward lower corner extending forwardly and downwardly therefrom for the purposes stated.

NICHOLAS WHITE.

Witnesses:
R. H. ORWIG,
THOMAS G. ORWIG.